United States Patent
Cotter

(10) Patent No.: US 10,527,121 B2
(45) Date of Patent: Jan. 7, 2020

(54) OVERTRAVEL PRESSURE RELIEF FOR A GAS SPRING

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 103 days.

(21) Appl. No.: 15/699,591

(22) Filed: Sep. 8, 2017

(65) Prior Publication Data

US 2018/0080519 A1 Mar. 22, 2018

Related U.S. Application Data

(60) Provisional application No. 62/395,729, filed on Sep. 16, 2016.

(51) Int. Cl.
*F16F 9/43* (2006.01)
*F16F 9/02* (2006.01)

(52) U.S. Cl.
CPC ............ *F16F 9/432* (2013.01); *F16F 9/0218* (2013.01); *F16F 9/0281* (2013.01); *F16F 2222/126* (2013.01); *F16F 2230/24* (2013.01)

(58) Field of Classification Search
CPC ...... F16F 9/432; F16F 9/0218; F16F 2230/04; F16F 2222/126; F16F 9/0281; F16F 2230/24
USPC ............... 267/119, 64.13, 64.15, 64.28, 118; 188/322.16, 322.17, 322.22, 322.21, 188/322.11
See application file for complete search history.

(56) References Cited

U.S. PATENT DOCUMENTS

| | | | | |
|---|---|---|---|---|
| 5,088,698 A | * | 2/1992 | Wallis | B21D 24/02 267/119 |
| 5,303,906 A | * | 4/1994 | Cotter | F16F 9/0227 188/300 |
| 5,344,125 A | * | 9/1994 | Cotter | F16F 9/0218 267/119 |

(Continued)

FOREIGN PATENT DOCUMENTS

| | | |
|---|---|---|
| CN | 103291684 A | 9/2013 |
| EP | 2 177 783 A2 | 4/2010 |

(Continued)

OTHER PUBLICATIONS

European Search Report and Opinion in European Patent Application No. 17191093.8 dated Feb. 20, 2018 (7 pages).

(Continued)

*Primary Examiner* — Pamela Rodriguez
(74) *Attorney, Agent, or Firm* — Reising Ethington P.C.

(57) ABSTRACT

A gas spring with a casing with an axially extending side wall, an open end and a closed end wall spaced from the open end and a pressure chamber provided in part by the walls to receive a gas therein under pressure and a piston rod slidably received in a housing received in the casing and movable between extended and retracted positions. A pressure relief collar slidably carried around the piston rod and normally projecting axially outwardly of the casing can be displaced axially inwardly during an overtravel condition of the piston rod to displace a portion of a piston rod seal to open an overpressure relief path to allow pressurized gas in the pressure chamber to escape to the outside of the gas spring.

20 Claims, 5 Drawing Sheets

(56) References Cited

U.S. PATENT DOCUMENTS

| | | | |
|---|---|---|---|
| 7,559,542 B2* | 7/2009 | Cotter | F16F 9/0218 |
| | | | 188/322.17 |
| 9,046,146 B2* | 6/2015 | Cotter | F16F 9/48 |
| 2009/0072453 A1* | 3/2009 | Cotter | F16F 9/0227 |
| | | | 267/64.13 |
| 2013/0228069 A1* | 9/2013 | Cappeller | F16J 10/00 |
| | | | 92/169.1 |
| 2014/0191452 A1* | 7/2014 | Moss | F16F 9/43 |
| | | | 267/119 |

FOREIGN PATENT DOCUMENTS

| | | |
|---|---|---|
| EP | 2 634 451 A1 | 9/2013 |
| EP | 2 778 465 A1 | 9/2014 |
| EP | 3 051 173 A2 | 8/2016 |

OTHER PUBLICATIONS

IPO Search Report in Taiwanese Patent Application No. 106131583 dated Mar. 20, 2019 (1 page).

* cited by examiner

OVERTRAVEL PRESSURE RELIEF FOR A GAS SPRING

This application claims the benefit of U.S. provisional patent application Ser. No. 62/395,729, the disclosure of which is incorporated herein by reference.

TECHNICAL FIELD

This invention relates generally to gas springs and, more particularly, to overtravel pressure relief features for gas springs.

BACKGROUND

Gas springs are well known and have been used in dies of presses for sheet metal stamping operations. For example, gas springs can be used as press cushions, among many other types of applications. A conventional gas spring includes a casing, a piston rod carried in the casing, a bearing and seal housing held in the casing by a retainer to guide and retain the piston rod within the casing, and a pressure chamber to hold pressurized gas, typically nitrogen at an operating pressure of, for example, 2,000 to 5,000 PSI in some applications. The housing includes one or more bearings to guide movement of the piston rod within the casing, and one or more seals to prevent leakage from the pressure chamber. The pressurized gas biases the piston rod to an extended position, and yieldably resists movement of the piston rod from the extended position to a retracted position. But the piston rod may overtravel beyond a design-intent retracted position, and such overtravel may result in undesirable overpressure and other undesirable conditions.

SUMMARY

In some implementations a gas spring for forming equipment may have a casing with a side wall, an open end and a closed end generally axially spaced from the open end and defining in part a pressure chamber to receive a gas under pressure, a piston rod housing received in the casing adjacent its open end, a piston rod received in the housing and reciprocal between extended and retracted positions, a piston rod seal encircling and bearing on the piston rod, and an overtravel pressure relief collar encircling the piston rod which may be slidably movable relative to the piston rod and with an outer end that normally projects axially beyond the open end of the casing. The collar may have an inner end contacting the piston rod seal and configured so that generally during an overtravel condition of the piston rod, axial movement of the collar toward the closed end of the casing displaces at least part of the seal from the piston rod to provide a path for escape of a gas under pressure from the pressure chamber to the exterior of the gas spring.

In at least some implementations, the overtravel pressure relief collar may also provide a bearing surface for the piston rod and be the only guide for axial reciprocation of the piston rod between its extended and retracted positions. In at least some implementations, a bearing may be carried by the piston rod housing for guiding axial reciprocation of the piston rod between its extended and retracted positions. In at least some implementations, the piston rod seal may be carried by the piston rod housing and in other implementations, the piston rod seal may be carried by the casing. In at least some implementations, the piston rod seal may include an inner lip in sealing engagement with the piston rod and an outer lip in sealing engagement with one of the piston rod housing or the casing. In at least some implementations, during an overtravel condition the collar may move in an axially inward direction with respect to the piston rod seal such that the collar inner end radially displaces at least part of the inner lip of the piston rod seal to allow pressurized gas in the pressure chamber to escape past the seal to the atmosphere outside of the gas spring.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figure 1:
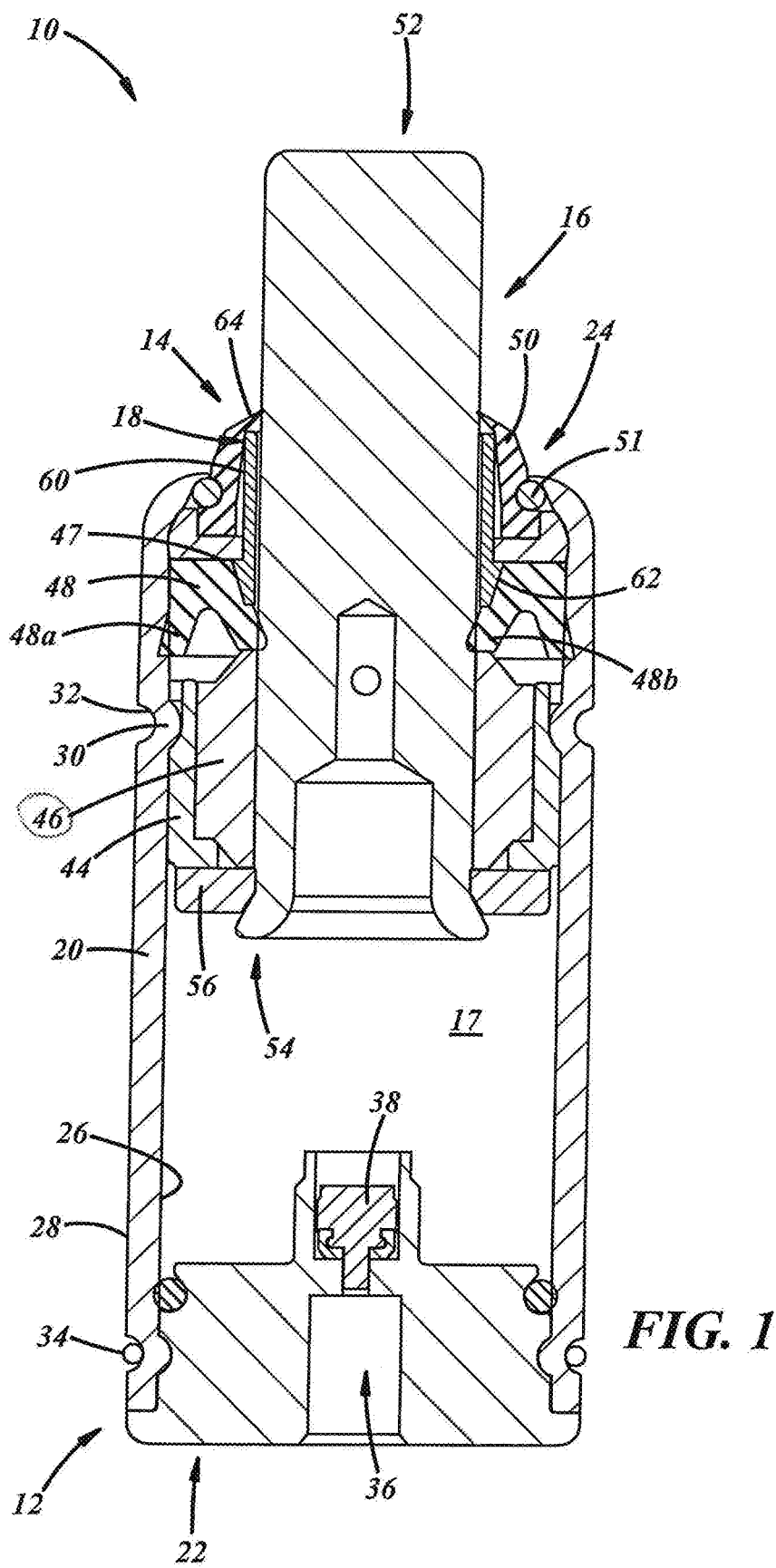
FIG. 1 is a sectional view of a presently preferred form of a gas spring with a piston in an extended position and having an overtravel pressure relief component.

Referring in more detail to the drawings, FIG. 1 illustrates a gas spring 10 that may be used in forming equipment, for example, sheet metal stamping dies and mechanical presses (not shown). In general, the gas spring 10 may include a casing 12, a guide and seal assembly 14 carried by the casing 12, a piston rod 16 carried by the casing 12 and extending through the guide and seal assembly 14, and a pressure chamber 17. An outer axial end of the piston rod 16 may be engageable with or by a die member or another portion of a press or piece of forming equipment (not shown).

For example, one or more of the gas springs 10 may be used in various implementations in forming equipment to provide a moveable component for support of a forming die or a workpiece with a yielding force or a return force. For example, in a binder ring implementation, the gas spring 10 may provide a yielding force against a binder ring of a forming die to hold a metal workpiece while another part of the forming die forms, cuts, stretches, or bends the workpiece. In a lifter implementation, the gas spring 10 may provide a yielding force and return force to lift a workpiece off of a surface of the forming die or to otherwise maintain control of the workpiece. In a cam tool implementation, the gas spring 10 may apply a yielding force to return a cam-activated tool to its home position. Of course, the gas spring 10 may be used in a wide range of other implementations.

According to the present disclosure, the gas spring 10 includes an overstroke or overtravel pressure relief component 18 in the event of an overtravel condition of the piston rod 16 of the gas spring 10. As will be discussed in greater detail below, the overtravel pressure relief component 18 may be part of the guide and seal assembly 14, and may function to allow pressurized gas to be communicated out of the pressure chamber 17, to provide protection in an overtravel condition, including possible overpressure of gas in the pressure chamber 17. As will be discussed in greater detail herein below, in the event of an overtravel condition, the overtravel pressure relief component 18 may be displaced so as to unseat a seal to release pressurized gas from within the pressure chamber 17 of the gas spring 10. As used herein, the terminology "overtravel condition" includes a condition where a die member, or any other machine component with which the gas spring 10 interacts, causes the piston rod to be retracted into the casing 12 beyond a design intent position in the gas spring 10.

With reference to FIG. 1, the casing 12 may include a side wall 20 that may terminate axially at a closed end 22 and at an open end 24 that may receive the guide and seal assembly 14 and the piston rod 16 therein. The pressure chamber 17 is established at least in part by the side and end walls 20, 22 to receive a gas under pressure. In the illustrated embodiment, the closed end 22 may be a separate component coupled to the side wall 20 and sealed thereto with a seal, for example, by crimping, swaging, or other forming. In other embodiments, the closed end 22 may be coupled to the side wall 20 via a weld joint, or may be integrally produced with the side wall 20. The side wall 20 of the casing 12 has an inner surface 26 defining at least in part the pressure chamber 17, and an outer surface 28. The casing 12 may be of generally cylindrical shape, for example, wherein at least one of the inner or outer surfaces 26, 28 is cylindrical. The side wall 20 may have a circumferentially extending retainer bead 30 to axially retain at least a portion of the guide and seal assembly 14 to maintain the gas spring 10 in its assembled state. To facilitate mounting and locating the gas spring 10 within a press, a pair of longitudinally spaced circumferential grooves 32, 34 may be machined, formed, or otherwise provided in the outer surface 28 of the casing 12. To admit gas into the gas spring 10, the casing 12 may include a passage or fill port 36 that may be provided through the closed end 22 of the casing 12 in any suitable manner. A fill valve 38 may be carried by the casing 12 to allow the gas spring 10 to be pressurized through the fill port 36 and to close the fill port 36 when the gas spring 10 is pressurized. The fill valve 38 may be a poppet valve, as illustrated, but instead may include a Schrader fill valve, or any other suitable type of valve in any suitable location at the closed end 22 of the casing 12.

The guide and seal assembly 14 may be disposed in, or carried proximate to, the open end 24 of the casing 12 and may be sealingly coupled to the casing 12. The assembly 14 may include a bearing assembly that may include a piston rod housing 44 and a guide bearing 46 carried by the housing 44. The assembly 14 also may include a rod seal 48 that may be disposed between the housing 44 and the open end 24, a seal backup 47 that may be disposed between the rod seal 48 and the open end 24, a rod wiper 50 that may be carried between the seal backup 47 and the open end 24 and may protrude out of the open end 24, and a casing seal 51 that may include an O-ring that may be carried between a portion of the wiper 50 and the open end 24. The guide bearing 46 may include one or more components and may be sized to slidably engage the piston rod 16 to guide the piston rod 16 for axial reciprocation within the casing 12. In the illustrated embodiment, the guide bearing 46 includes a bushing, which may be composed of any suitable low friction material. The piston rod seal 48 may include a U-cup seal having a radially outer lip 48a in contact with the interior surface 26 of the casing 12 and a radially inner lip 48b in contact with an exterior surface of the piston rod 16.

The piston rod 16 is disposed at least in part in the casing 12 and through the guide and seal assembly 14 for reciprocation along an axis A between extended and retracted positions over a cycle of the gas spring 10 including a retraction stroke and an extension or return stroke. The piston rod 16 is acted on by pressurized gas in the pressure chamber 17 to bias the piston rod 16 toward the extended position, and away from the retracted position. The piston rod 16 extends out of the casing 12 through the guide and seal assembly housing 44, and includes an outer axial end 52, and an inner axial end 54 disposed in the casing 12 and that may be radially enlarged. For example, a piston retainer 56 may be coupled to the inner axial end 54, for instance, via swaging of the piston rod 16 thereto. The retainer 56 may be engageable with a portion of the piston rod housing 44 to retain the piston rod 16 in the casing 12. The piston rod 16 is in sealing engagement with the rod seal 48 and in sliding engagement with the piston rod bearing 46 for guided relative movement between the extended and retracted positions.

As illustrated, the overtravel pressure relief component 18 may include a collar 60, which may be slidably carried around the piston rod 16 at least partially axially between the guide and seal assembly 14 and the casing open end 24 and axially retained by the seal backup 47. In the illustrated embodiment, the collar 60 is circumferentially continuous and has a cylindrical inner surface. The collar 60 includes an inner end 62 disposed axially inward with respect to the open end 24 of the housing 12 and contacting the piston rod seal 48, and an axially outer end 64 disposed axially beyond or outward with respect to the open end 24 of the housing 12. In other words, the collar 60 extends axially proud of or beyond the housing 44 and the casing 12 at the axially outer 64 thereof. The collar inner end 62 may be bayonet-shaped or wedge-shaped, for instance, including a barb with a shoulder, a cylindrical inner surface and an outer surface disposed at a non-zero angle with respect to the inner surface of the collar 60. The seal backup 47 includes an inner diameter smaller than an outer diameter of the collar inner end 62 so as to axially retain the collar 60 in the gas spring 10. The wiper 50 protrudes axially beyond the collar outer end 64 and may be engaged with the piston rod 16 such that the collar 60 is concealed by the wiper 50.

The gas spring 10 may be assembled in any suitable manner and its various components may be manufactured in any suitable manner and composed of any suitable materials. For example, the casing 12 may be turned, bored, drilled, tapped, and/or otherwise machined from a metal tube and/or metal bar stock such as steel. In another example, the collar 60 may be constructed from, for example, steel, brass, copper, carbon fiber, polymeric material, and/or any other suitable material(s).

In operation, any suitable pressurizing device (not shown) may be coupled to the port 36 to open the valve 38 and introduce pressurized gas into the port 36. Once a desired pressure is reached, the pressurizing device may be retracted to allow the valve 38 to close and thereby seal the pressurized gas within the pressure chamber 17.

Figure 2:
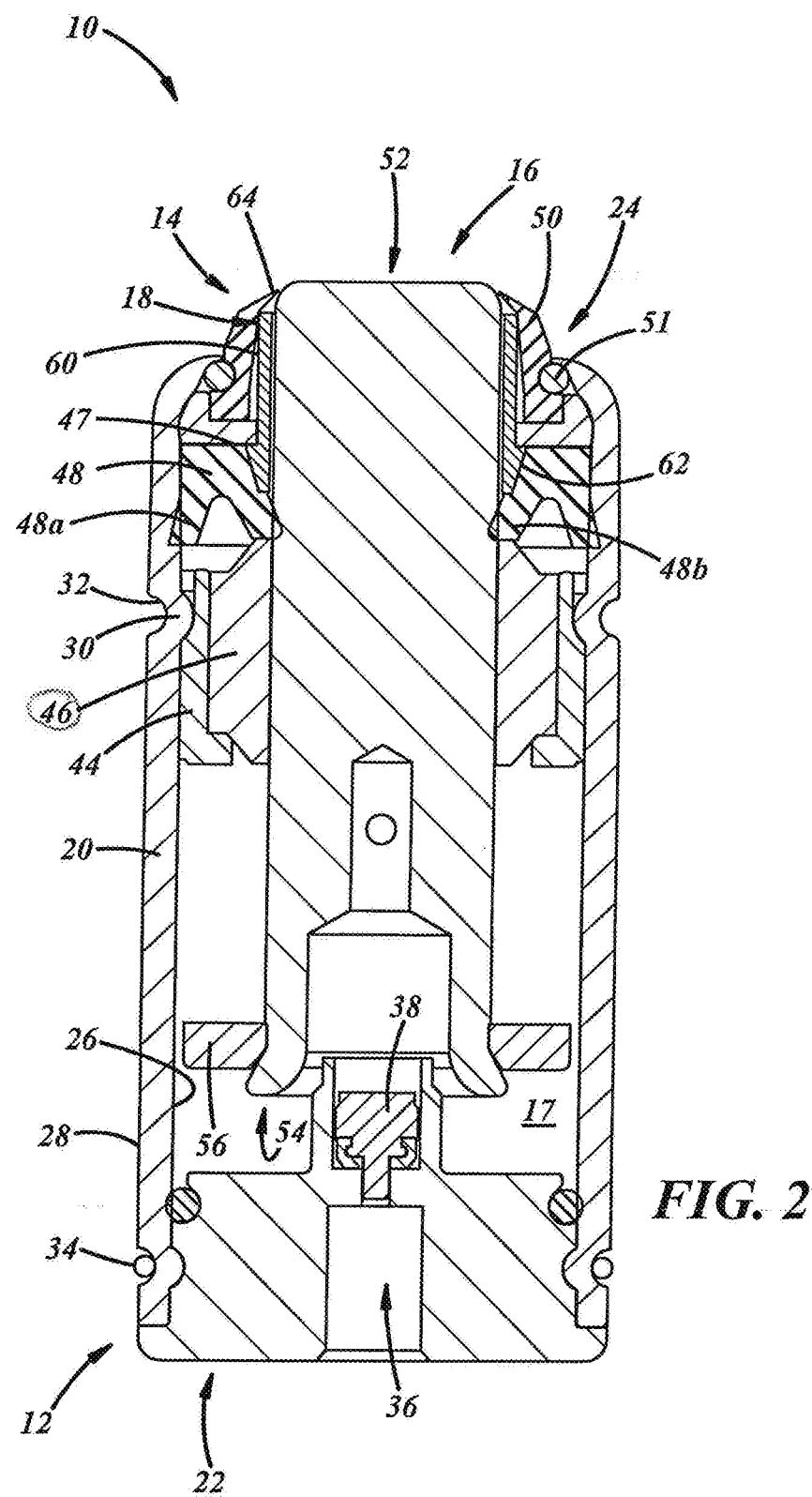
FIG. 2 is a sectional view of the gas spring of FIG. 1, illustrating the piston in a design-intent maximum travel position.
Figure 3:
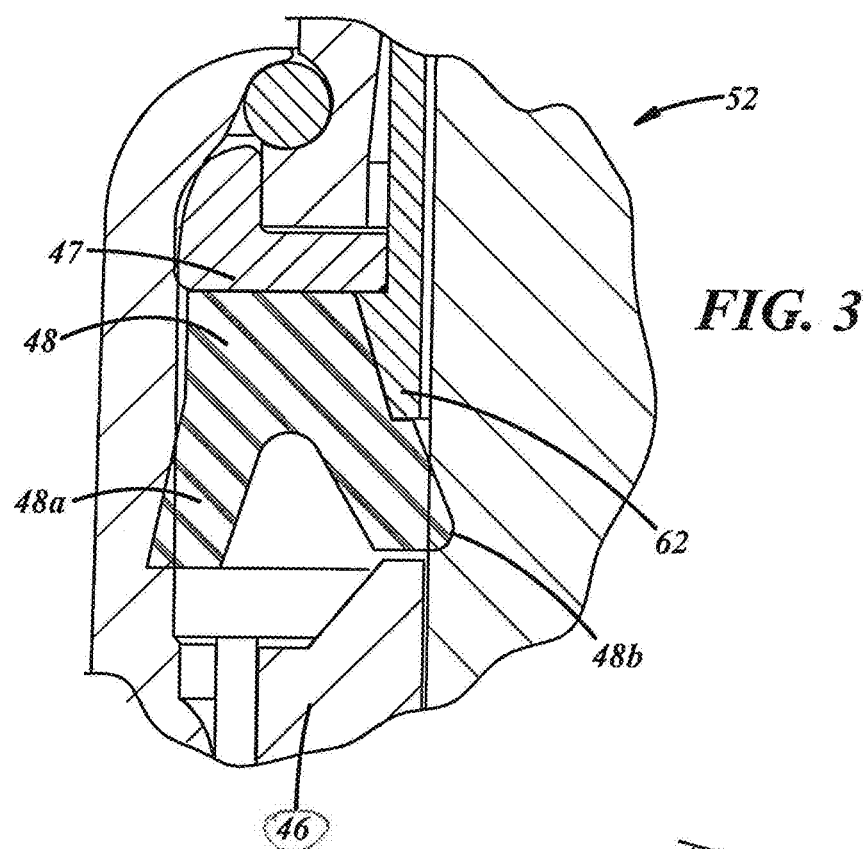
FIG. 3 is an enlarged fragmentary sectional view of a portion of the gas spring of FIG. 2.

During use, and with respect to FIG. 2, a die member or any other machine component (not shown) may displace the piston rod 16 in an axially inward direction into the casing 12 so as to compress the gas in the pressure chamber 17. FIG. 2 illustrates the gas spring 10 in a design intent maximum compression position of the piston rod 16 relative to the casing 12. As shown, in this position, an axially outermost surface of the piston rod 16 protrudes axially beyond an axially outermost surface of the overtravel relief component 18. Also, as shown in FIG. 3, the overtravel relief component 18 has not moved relative to the seal 48.

Figure 5:
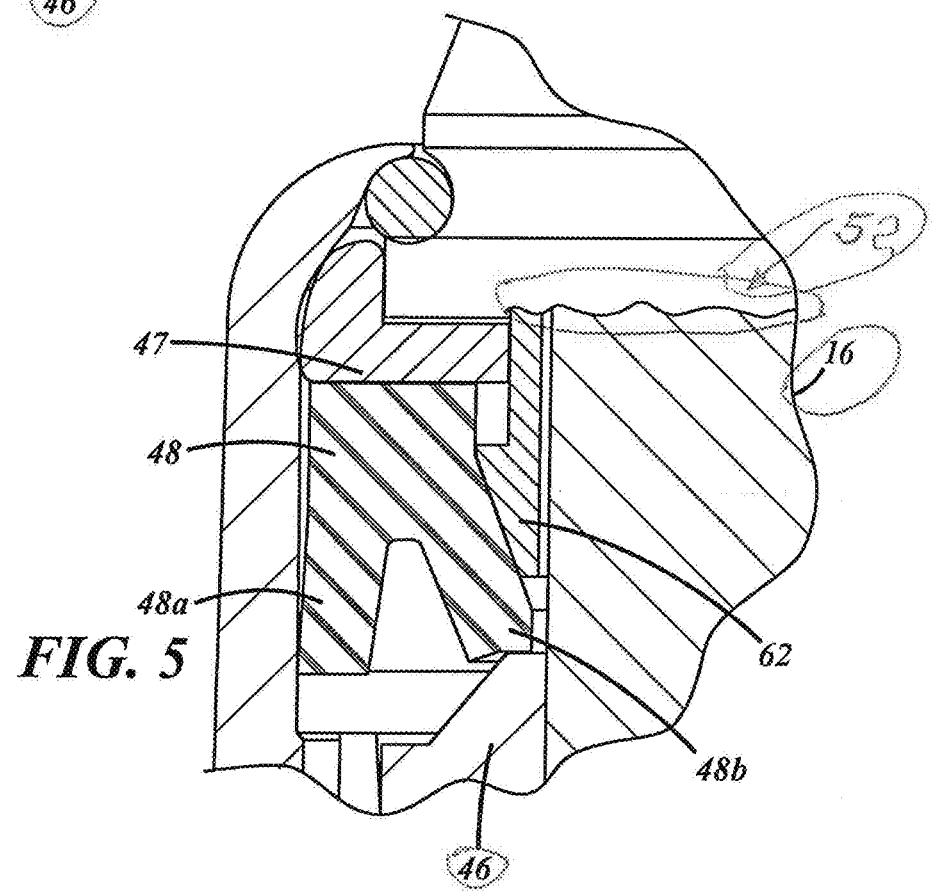
FIG. 5 is an enlarged fragmentary sectional view of a portion of the gas spring of FIG. 4.
Figure 4:
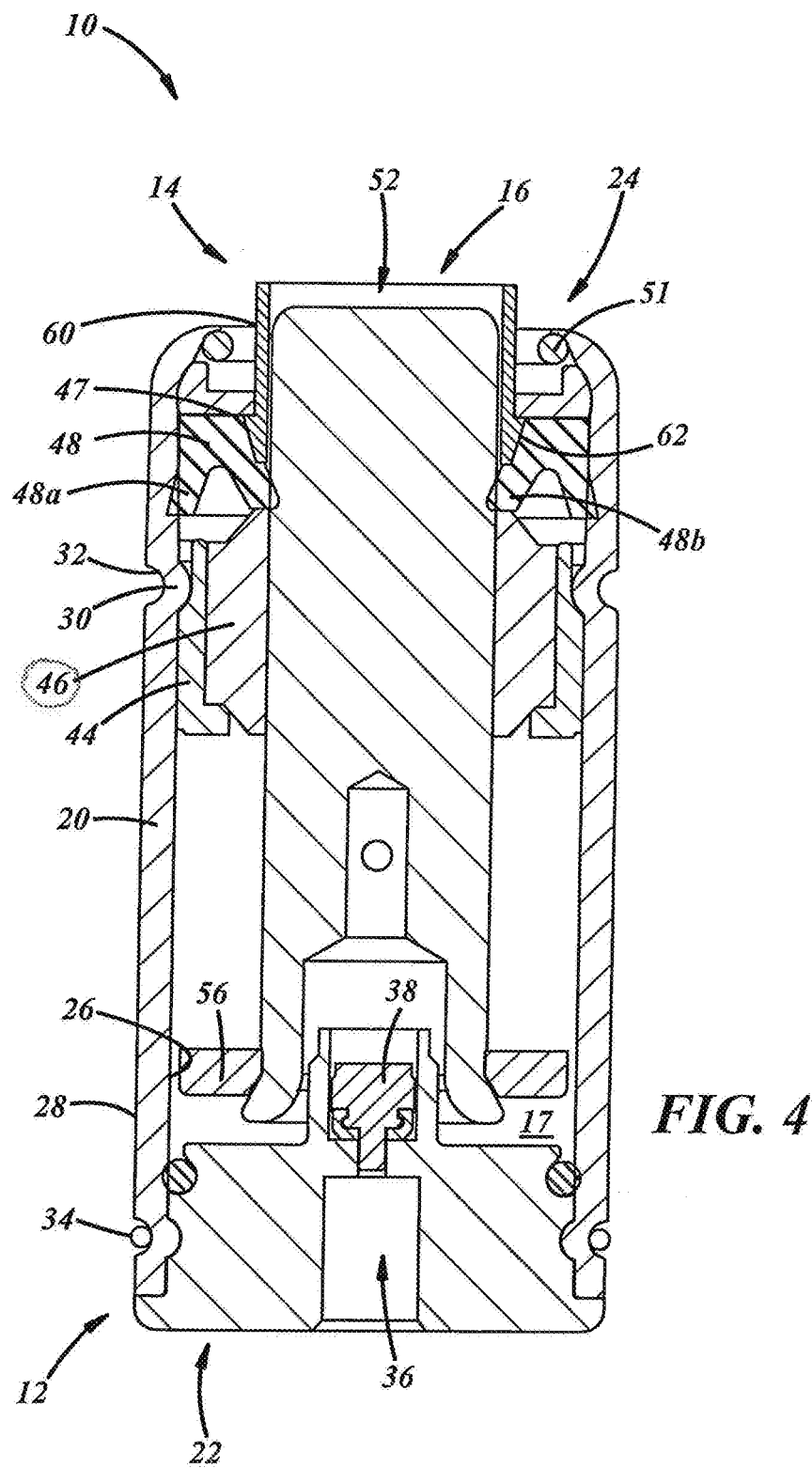
FIG. 4 is a sectional view of the gas spring of FIG. 1, illustrating the piston in an overtravel position and depicting an exhaust of gas from the spring.

In contrast, however, with reference to FIG. 4, the die member or any other machine component (not shown) may further axially displace the piston rod 16 into the casing 12. In the event of such an overtravel condition where the machine component travels beyond a design intent position with respect to the gas spring 10, the machine component strikes the axially outer end 64 of the overtravel relief component 18, resulting in displacement thereof. Such axial displacement of the overtravel relief component 18 will result in radially outward displacement of a portion of the seal 48, thereby allowing pressurized gas in the chamber 17 to escape through a path between the piston rod 16 and the seal 48 to the exterior of the gas spring 10, as illustratively depicted in FIG. 4 and as more clearly shown in FIG. 5.

In the illustrated embodiment, for example, during an overtravel condition, the collar 60 moves in an axially inward direction with respect to the piston rod seal 48 such that the collar inner end 62 radially displaces the inner lip 48b of the piston rod seal 48 to open an overpressure relief path to allow pressurized gas in the pressure chamber 17 to escape through the relief path to atmosphere outside the gas spring 10. More specifically, corresponding inclined/angled surfaces of the collar inner end 62 and the seal inner lip 48b cooperate such that relative axial movement therebetween causes radially outward movement of the seal 48 to unseat or breach sealing engagement between the seal 48 and the piston rod 16.

Figure 6:
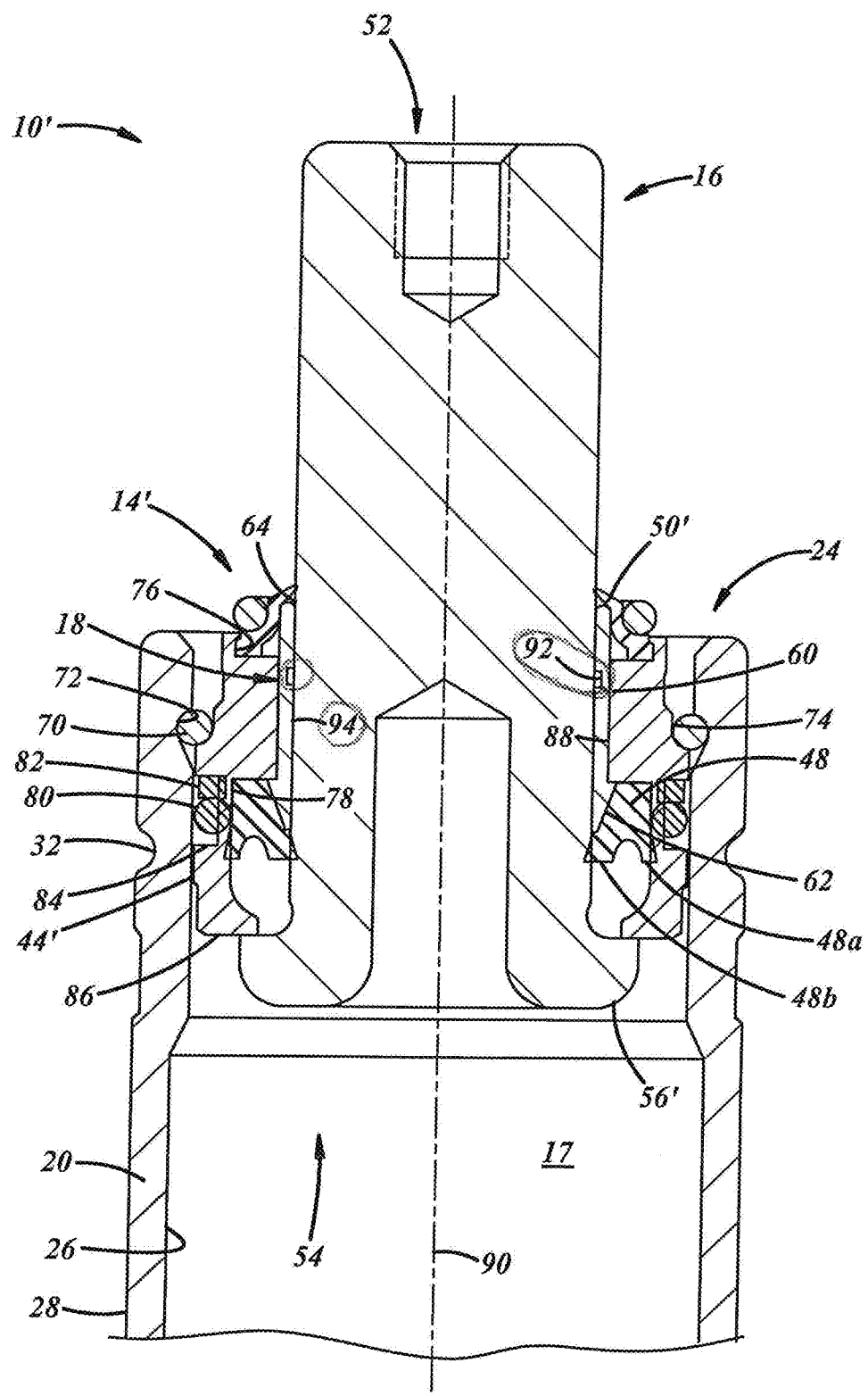
FIG. 6 is a fragmentary sectional view of FIG. 1 with a modified guide and seal assembly.

FIG. 6 illustrates a gas spring 10' which has essentially the same construction and arrangement as the gas spring 10 except for a modified guide and seal assembly 14'. Components of the gas spring 10' which are essentially the same as those of gas spring 10 are identified with the same reference numbers as the corresponding components of the gas spring 10 and thus a description of these components will not be repeated.

The modified guide and seal assembly 14' has an annular housing 44' slidably received in the casing 12 and removably retained therein by a split ring 70 of two segments received in complementary annular recesses 72 and 74 in the housing and the casing adjacent the open end. A rod wiper 50' is received in an annular recess 76 in the upper end of the housing 44'. A piston rod seal 48 is received and retained in an annular recess 78 in housing 44' which recess opens radially inward onto the piston rod 16. A seal between the housing 44' and the casing may be provided by an o-ring 80 and a backing ring 82 received in an annular groove 84 in the housing and opening radially outwardly onto the casing 12. The piston rod 16 may have an integral retainer 56' which in the fully extended position of the rod overlaps and bears on the inner end 86 of the housing 44' to provide a positive stop for the piston rod when it moves to its fully extended position.

The overtravel pressure relief collar 60 is slidably received both over and around the piston rod 16 and in a bore 88 through the housing 44' which bore may be coaxial with the cylindrical casing wall 26. The collar 60 may also provide the only bearing guiding reciprocal movement of the piston rod 16 between its extended and retracted positions. The collar 60 may have a groove 92 opening radially inwardly onto the piston rod 116 for receiving and retaining a suitable lubricant for the bearing surfaces 94 of the collar.

In the event of an overtravel condition of the piston rod, the collar 60 moves in an axially inward direction with respect to the rod seal 48 and displaces at least a portion of the inner lip 48b of the seal 48 from the rod 16 to open an overtravel pressure relief path allowing pressurized gas in the pressure chamber 17 to escape through this relief path to the atmosphere outside of the gas spring 10'. In use, the gas spring 10' operates in the same manner as the gas spring 10 and thus its operation will not be repeated.

It should be appreciated that one of ordinary skill in the art will recognize other embodiments encompassed within the scope of this invention. The plurality of arrangements shown and described above are merely illustrative and not a complete or exhaustive list or representation. Of course, still other embodiments and implementations can be achieved in view of this disclosure. The embodiments described above are intended to be illustrative and not limiting. The scope of the invention is defined by the claims that follow.

The invention claimed is:

1. A gas spring for forming equipment, comprising:
a casing including an axially extending side wall, an open end, a transversely extending closed end wall axially spaced from the open end, and a pressure chamber established in part by the side and end walls to receive a gas under pressure;
a bearing assembly carried inside the casing, and including:
a piston rod housing including a rod inner end, and a rod outer end axially spaced from the rod inner end, and
a piston rod bearing carried by the piston rod housing;
a piston rod slidably received in the piston rod bearing for reciprocation between extended and retracted positions;
a piston rod seal carried between the bearing assembly and the casing open end and in sealing contact with the casing and normally in sealing contact with the piston rod;
an overtravel pressure relief collar slidably carried around the piston rod at least partially axially between the bearing assembly and the casing open end, and having a collar outer end that normally projects axially beyond the piston rod housing and a collar inner end configured to contact at least a portion of the piston rod seal; and
in an overtravel condition the collar is moved in an axially inward direction with respect to the piston rod seal to open an overpressure relief path between the piston rod and the piston rod seal to allow pressurized gas in the pressure chamber to escape through the relief path to the atmosphere outside of the gas spring.

2. The gas spring of claim 1, wherein the piston rod seal is a U-cup seal having a radially outer lip in contact with an interior surface of the casing and a radially inner lip in contact with an exterior surface of the piston rod.

3. The gas spring of claim 1, wherein the collar inner end of the overtravel pressure relief collar is bayonet-shaped.

4. The gas spring of claim 1, further comprising a seal backup disposed between the piston rod seal and the open end of the casing and including an inner diameter smaller than an outer diameter of the collar inner end so as to axially retain the collar in the gas spring.

5. The gas spring of claim 1, further comprising a wiper carried at the open end of the casing and protruding axially beyond the collar outer end and engaged with the piston rod such that the collar is concealed by the wiper.

6. The gas spring of claim 1, wherein the piston rod seal includes an outer lip in contact with an inner surface of the casing and an inner lip in contact with an outer surface of the piston rod.

7. The gas spring of claim 6, wherein, during an overtravel condition, the collar moves in an axially inward direction with respect to the piston rod seal such that the collar inner end radially displaces the inner lip of the piston rod seal to open an overpressure relief path to allow pressurized gas in the pressure chamber to escape through the relief path to atmosphere outside the gas spring.

8. The gas spring of claim 1, wherein, during an overtravel condition, the collar moves in an axially inward direction with respect to the piston rod seal such that the collar radially displaces a portion of the piston rod seal to open an overpressure relief path to allow pressurized gas in the pressure chamber to escape through the relief path to atmosphere outside the gas spring.

9. The gas spring of claim 1, wherein, the overtravel pressure relief collar also provides the bearing assembly for the piston rod.

10. The gas spring of claim 9, wherein, the overtravel pressure relief collar also includes an annular groove opening onto the piston rod for receiving lubricant therein.

11. A gas spring for forming equipment, comprising:
a casing including an axially extending side wall, an open end, a transversely extending closed end wall axially spaced from the open end, and a pressure chamber established in part by the side and closed end walls to receive a gas under pressure therein;
a piston rod housing including an inner end and an outer end axially spaced from the inner end and received in the casing adjacent the open end of the casing;
a piston rod extending through the piston rod housing and having an inner end received in the pressure chamber and an outer end normally outside of the casing;
a piston rod seal carried by the housing and normally providing a seal between the piston rod and the housing;
a seal carried by the housing and providing a seal between the housing and the casing;
an overtravel pressure relief collar slidably received around the piston rod, slidably carried by the housing, and having a collar outer end that normally projects axially beyond the open end of the casing and a collar inner end configured to contact at least a portion of the piston rod seat; and
in an overtravel condition the collar is moved in an axially inward direction with respect to the piston rod seal to open an overpressure relief path between the piston rod and piston rod seal to allow pressurized gas in the pressure chamber to escape through the relief path to the atmosphere outside of the gas spring.

12. The gas spring of claim 11, wherein, the piston rod seal is a u-cup seal having a radially outer lip in contact with an interior surface of the piston rod housing and a radially inner lip in contact with an exterior surface of the piston rod.

13. The gas spring of claim 11, wherein, the inner end of the overtravel pressure relief collar is bayonet shaped.

14. The gas spring of claim 13, wherein, a portion of the collar adjacent its inner end overlaps a portion of the housing to retain the collar in the gas spring.

15. The gas spring of claim 11, further comprising a piston rod wiper carried by the collar adjacent the open end of the casing and projecting axially beyond the collar outer end and engaged with the piston rod.

16. The gas spring of claim 11, wherein, the piston rod seal includes an outer lip in contact with an inner surface of the housing and an inner lip in contact with an outer surface of the piston rod.

17. The gas spring of claim 16 wherein during an overtravel condition, the collar moves in an axially inward direction with respect to the piston rod seal to open an overpressure relief path to allow pressurized gas in the pressure chamber to escape through the relief path to the atmosphere outside of the gas spring.

18. The gas spring of claim 11 wherein during an overtravel condition, the collar moves in an axially inward direction with respect to the piston rod seal such that the collar radially displaces a portion of the piston rod seal to open an overpressure relief path to allow pressurized gas in the pressure chamber to escape through the relief path to the atmosphere outside of the gas spring.

19. The gas spring of claim 18, wherein during an overtravel condition of the piston rod, the collar is moved in an axially inward direction with respect to the piston rod seal such that the collar displaces at least part of the piston rod seal generally radially outward with respect to the piston rod to open the overtravel pressure relief path.

20. A gas spring for forming equipment, comprising:
a casing including an axially extending side wall, an open end, a transversely extending closed end wall axially spaced from the open end, and a pressure chamber established in part by the side and enclosed end walls to receive a gas under pressure therein;
a piston rod carried by the casing for reciprocation between extended and retracted positions and having an inner end in the pressure chamber and an outer end normally outside of the casing;
a piston rod seal carried by the casing and normally in sealing engagement with the piston rod;
an overtravel pressure relief collar slidably received around the piston rod, carried by the casing, having a collar outer end normally projecting axially outward beyond the open end of the casing, and a collar inner end configured to contact at least a portion of the piston rod seal; and
in an overtravel condition, the collar is moved in an axially inward direction with respect to the piston rod seal to open an overpressure relief path between the piston rod and the seal to allow pressurized gas in the pressure chamber to escape through the relief path to the atmosphere outside of the gas spring.

\* \* \* \* \*